US010432028B2

United States Patent
Ahn et al.

(10) Patent No.: US 10,432,028 B2
(45) Date of Patent: *Oct. 1, 2019

(54) WIRELESS POWER TRANSMISSION SYSTEM AND WIRELESS POWER RELAY APPARATUS

(71) Applicant: Samsung Electronics Co., Ltd., Suwon-si (KR)

(72) Inventors: Chi Hyung Ahn, Suwon-si (KR); Sang Wook Kwon, Seongnam-si (KR); Ki Young Kim, Yongin-si (KR); Nam Yun Kim, Seoul (KR); Dong Zo Kim, Yongin-si (KR); Bong Chul Kim, Seoul (KR); Yun Kwon Park, Dongducheon-si (KR); Jae Hyun Park, Yongin-si (KR); Keum Su Song, Seoul (KR); Young Ho Ryu, Yongin-si (KR); Byoung Hee Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 254 days.

This patent is subject to a terminal disclaimer.

(21) Appl. No.: 15/438,524

(22) Filed: Feb. 21, 2017

(65) Prior Publication Data
US 2017/0163098 A1   Jun. 8, 2017

Related U.S. Application Data

(63) Continuation of application No. 14/339,774, filed on Jul. 24, 2014, now Pat. No. 9,601,272.

(30) Foreign Application Priority Data

Aug. 7, 2013   (KR) ........................ 10-2013-0093766

(51) Int. Cl.
*H02J 50/12* (2016.01)
*B60L 53/30* (2019.01)
(Continued)

(52) U.S. Cl.
CPC .............. *H02J 50/12* (2016.02); *B60L 53/12* (2019.02); *B60L 53/30* (2019.02); *B60L 53/305* (2019.02);
(Continued)

(58) Field of Classification Search
CPC ............................... H01F 27/105; H01F 38/14
See application file for complete search history.

(56) References Cited

U.S. PATENT DOCUMENTS 9,601,272 B2 * 3/2017 Ahn ........................ H01F 38/14
2012/0010079 A1   1/2012 Sedwick
(Continued)

FOREIGN PATENT DOCUMENTS

JP          5-161218 A        6/1993
KR    10-2010-0090711 A        8/2010
(Continued)

*Primary Examiner* — Paul A Wartalowicz
(74) *Attorney, Agent, or Firm* — Sughrue Mion, PLLC

(57) ABSTRACT

A wireless power relay apparatus includes a relay resonator configured to relay power from a source resonator configured to wirelessly transmit the power, to a target resonator configured to wirelessly receive the power through a mutual resonance, the relay resonator having a higher quality factor than the source resonator and the target resonator.

20 Claims, 24 Drawing Sheets

(51) Int. Cl.
  *B60L 53/65*   (2019.01)
  *B60L 58/12*   (2019.01)
  *H01F 6/06*    (2006.01)
  *H01F 38/14*   (2006.01)
  *H02J 5/00*    (2016.01)
  *H02J 7/02*    (2016.01)
  *H02J 50/40*   (2016.01)
  *H02J 50/50*   (2016.01)
  *H02J 50/70*   (2016.01)
  *H02M 3/04*    (2006.01)
  *H02M 7/04*    (2006.01)
  *H02M 7/06*    (2006.01)
  *H04B 5/00*    (2006.01)
  *B60L 53/12*   (2019.01)

(52) U.S. Cl.
  CPC .............. *B60L 53/65* (2019.02); *B60L 58/12* (2019.02); *H01F 6/06* (2013.01); *H01F 38/14* (2013.01); *H02J 5/005* (2013.01); *H02J 7/025* (2013.01); *H02J 50/40* (2016.02); *H02J 50/50* (2016.02); *H02J 50/70* (2016.02); *H02M 3/04* (2013.01); *H02M 7/04* (2013.01); *H02M 7/06* (2013.01); *H04B 5/0037* (2013.01); *B60L 2210/10* (2013.01); *B60L 2210/30* (2013.01); *B60L 2210/40* (2013.01); *B60L 2240/36* (2013.01); *Y02T 10/705* (2013.01); *Y02T 10/7005* (2013.01); *Y02T 10/7044* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

2012/0235505 A1   9/2012   Schatz et al.
2013/0221744 A1   8/2013   Hall et al.

FOREIGN PATENT DOCUMENTS

KR   10-2011-0036639 A   4/2011
KR   10-2011-0120068 A   11/2011

* cited by examiner

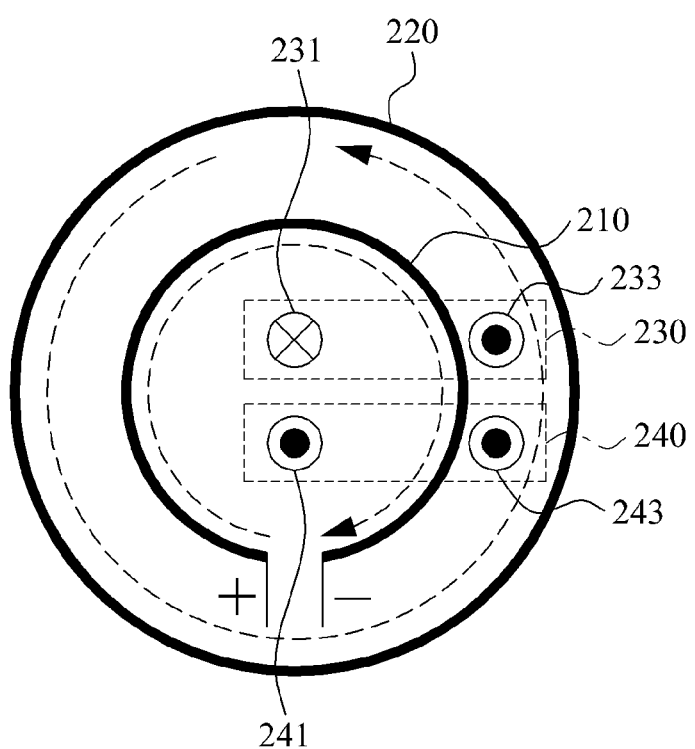

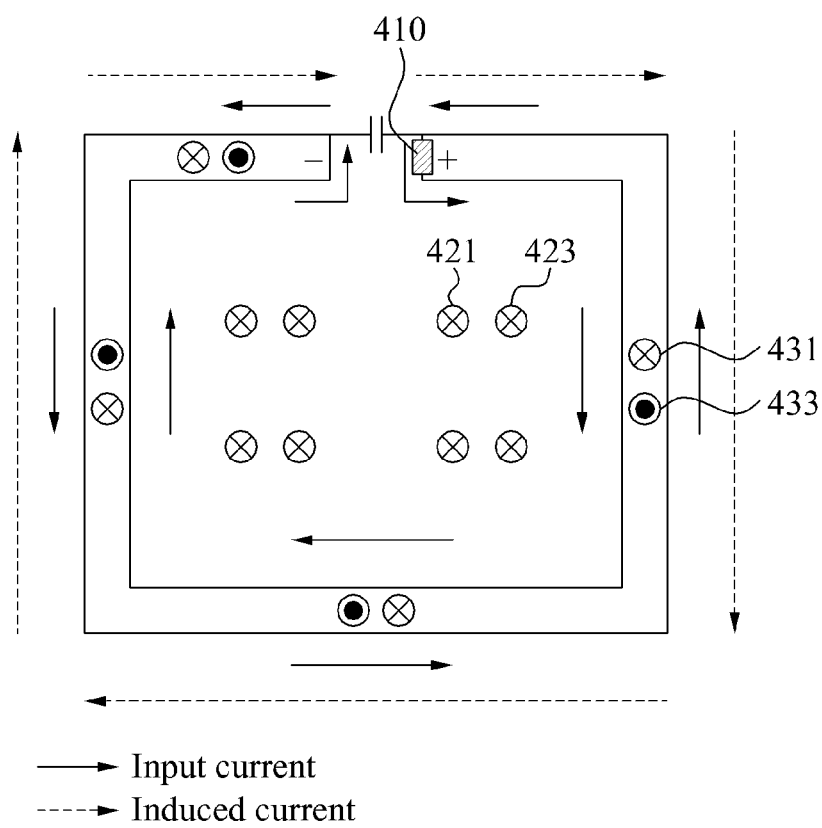

1220

WIRELESS POWER TRANSMISSION SYSTEM AND WIRELESS POWER RELAY APPARATUS

CROSS-REFERENCE TO RELATED APPLICATION

This application is a Continuation Application of U.S. application Ser. No. 14/339,774 filed on Jul. 24, 2014, which claims the benefit under 35 USC 119(a) of Korean Patent Application No. 10-2013-0093766, filed on Aug. 7, 2013, in the Korean Intellectual Property Office, the entire disclosure of which is incorporated herein by reference for all purposes.

BACKGROUND

1. Field

The following description relates to a wireless power transmission system and a wireless power relay apparatus.

2. Description of Related Art

Wireless power refers to energy that is transferred from a wireless power transmission apparatus to a wireless power reception apparatus through magnetic coupling. Accordingly, a wireless power charging system includes a source device configured to wirelessly transmit power, and a target device configured to wirelessly receive power. The source device may be referred to as a wireless power transmission apparatus, and the target device may be referred to as a wireless power reception apparatus.

The source device may include a source resonator, and the target device may include a target resonator. Magnetic coupling or resonant coupling may be formed between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless power relay apparatus, including a relay resonator configured to relay power from a source resonator configured to wirelessly transmit the power, to a target resonator configured to wirelessly receive the power through a mutual resonance, the relay resonator having a higher quality factor than the source resonator and the target resonator.

The relay resonator may be configured to form a parasitic coupling to either one or both of the source resonator and the target resonator.

The relay resonator may be disposed in the same plane as either one or both of the source resonator and the target resonator.

The relay resonator may include a material with a higher quality factor than a material of each of the source resonator and the target resonator.

The relay resonator may include a multi-array resonator including resonators, and the resonators are electrically connected based on a magnetic field formed between the resonators.

A size of the relay resonator may be larger than a size of each of the source resonator and the target resonator.

A coil included in the relay resonator may be thicker than a coil included in each of the source resonator and the target resonator.

A number of turns of a coil included in the relay resonator may be greater than a number of turns of a coil included in each of the source resonator and the target resonator.

The relay resonator may be enclosed by a magnetic material.

The quality factor may include a value enabling the relay resonator to mutually resonate with the source resonator and the target resonator at an efficiency that is greater than or equal to a predetermined efficiency, in response to a quality factor of either one or both of the source resonator and the target resonator being lower than a predetermined threshold.

The predetermined threshold may be "100".

In another general aspect, there is provided a wireless power relay apparatus, including a relay resonator configured to mutually resonate with a source resonator and a target resonator, to wirelessly transfer power from the source resonator to the target resonator, the relay resonator having a higher quality factor than the source resonator and the target resonator.

The wireless power relay apparatus may further include a cooler configured to cool the relay resonator to maintain a superconductive property of the relay resonator, the relay resonator including a superconductive material.

The relay resonator may include a parasitic resonator disposed in the same plane as either one or both of the source resonator and the target resonator, and configured to form a parasitic coupling.

The relay resonator may be disposed either one or both of inside and outside at least one of the source resonator and the target resonator.

Any one or any combination of a material, a structure, and a size of the relay resonator may have a higher quality factor than the source resonator and the target resonator.

In still another general aspect, there is provided a wireless power relay apparatus, including a first resonator configured to transfer power from a second resonator to a third resonator, and having a higher quality factor than the second and third resonators.

A number of turns of a coil included in the first resonator may be greater than a number of turns of a coil included in each of the second and third resonators.

The first resonator may include resonators in an array, and the resonators may be connected based on a magnetic field formed between the resonators.

The wireless power relay apparatus may further include a cooler configured to cool the first resonator to maintain a superconductive property of the first resonator.

The first resonator may be disposed inside or outside the second resonator.

Other features and aspects will be apparent from the following detailed description, the drawings, and the claims.

BRIEF DESCRIPTION OF THE DRAWINGS

FIGS. 2A through 2B are diagrams illustrating examples of a distribution of a magnetic field in a feeder and a resonator.

FIG. 4A is a diagram illustrating an example of a distribution of a magnetic field within a resonator based on feeding of a feeder.

Figure 1:
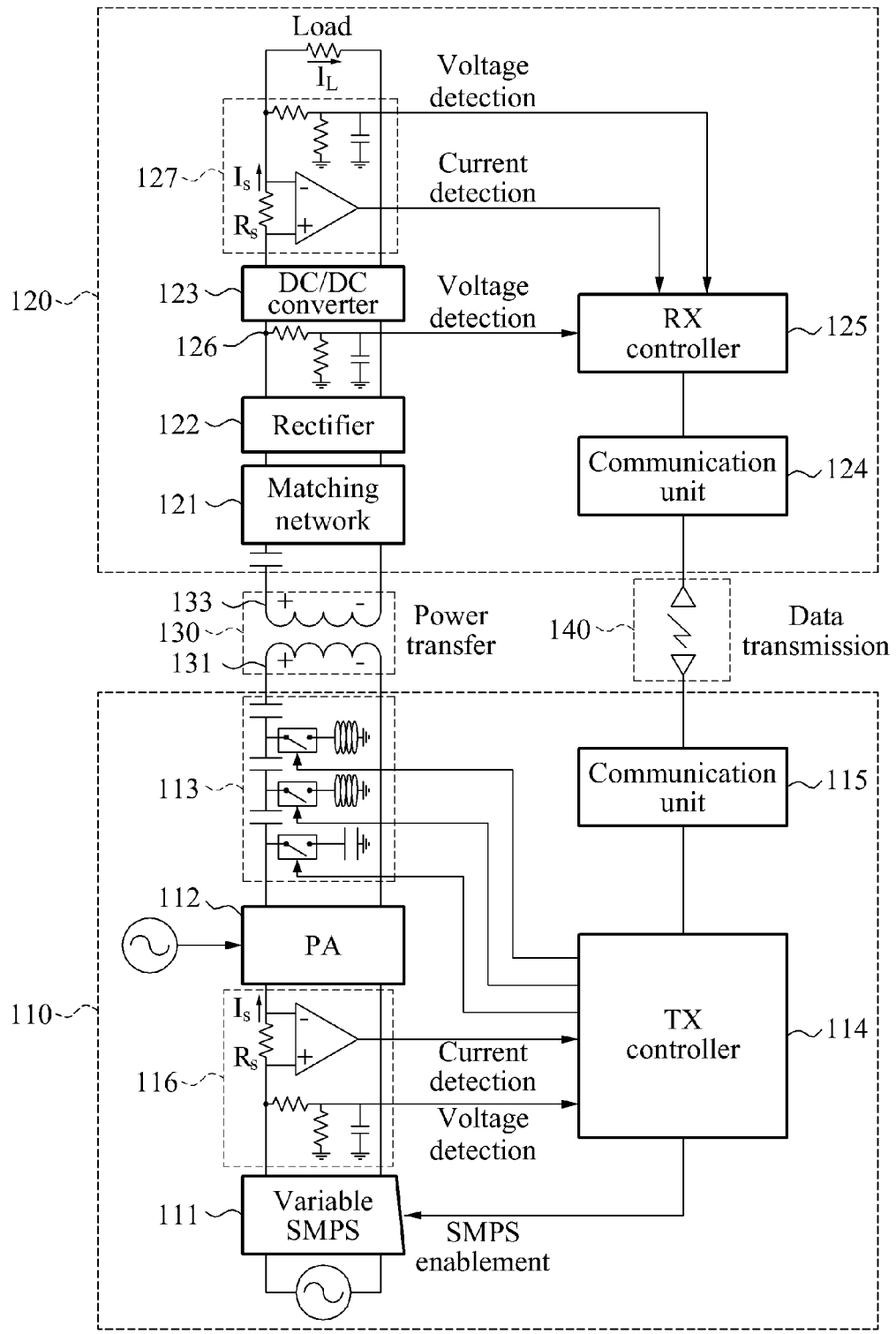
FIG. 1 is a diagram illustrating an example of a wireless power transmission system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A scheme of performing communication between a source device and a target device may include an in-band communication scheme and an out-band communication scheme. The in-band communication scheme enables the source device and the target device to communicate with each other in the same frequency band as used for power transmission. The out-band communication scheme enables the source device and the target device to communicate with each other in different frequency bands than those used for power transmission.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) controller 114, a communication unit 115, a power detector 116, and a source resonator 131. The target device 120 includes a matching network 121, a rectifier 122, a direct current-to-direct current (DC/DC) converter 123, a communication unit 124, a reception (RX) controller 125, a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the TX controller 114.

The power detector 116 detects an output current and an output voltage of the variable SMPS 111, and provides, to the TX controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The TX controller 114 may detect a reflected wave of the communication power or a reflected wave of the charging power, and may detect mismatching between the target resonator 133 and the source resonator 131 based on the detected reflected wave. The TX controller 114 may detect the mismatching by detecting an envelope of the reflected wave, or by detecting an amount of a power of the reflected wave.

Under the control of the TX controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the TX controller 114 through a switch, which is under the control of the TX controller 114.

The TX controller 114 may calculate a voltage standing wave ratio (VSWR) based on a voltage level of the reflected wave and a level of an output voltage of the source resonator 131 or the power amplifier 112. When the VSWR is greater than a predetermined value, the TX controller 114 detects the mismatching. In this example, the TX controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the TX controller 114 may control a frequency of the switching pulse signal used by the power amplifier 112. By controlling the switching pulse signal used by the power amplifier 112, the TX controller 114 may generate a modulation signal to be transmitted to the target device 120. In other words, the communication unit 115 may transmit various messages to the target device 120 via in-band communication. Additionally, the TX controller 114 may detect a reflected wave, and may demodulate a signal received from the target device 120 through an envelope of the reflected wave.

The TX controller 114 may generate a modulation signal for in-band communication using various schemes. To generate a modulation signal, the TX controller 114 may turn on or off the switching pulse signal used by the power amplifier 112, or may perform delta-sigma modulation. Additionally, the TX controller 114 may generate a pulse-width modulation (PWM) signal having a predetermined envelope.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the RX controller 125. The RX controller 125 uses the detected voltage of the input terminal 126 to compute a transmission efficiency of power received from the source device 110. Additionally, the RX controller 125 uses the detected current and the detected voltage of the output terminal to compute an amount of power transferred to the load. The TX controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the TX controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the RX controller 125 may demodulate a message received via the in-band communication.

Additionally, the RX controller 125 may adjust an impedance of the target resonator 133 to modulate a signal to be transmitted to the source device 110. For example, the RX controller 125 may increase the impedance of the target resonator so that a reflected wave will be detected by the TX controller 114 of the source device 110. In this example, depending on whether the reflected wave is detected, the TX controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

The TX controller 114 sets a resonance bandwidth of the source resonator 131. Based on the resonance bandwidth of the source resonator 131, a Q-factor $Q_S$ of the source resonator 131 is set.

The RX controller 125 sets a resonance bandwidth of the target resonator 133. Based on the resonance bandwidth of the target resonator 133, a Q-factor $Q_D$ of the target resonator 133 is set. For example, the resonance bandwidth of the source resonator 131 may be set to be wider or narrower than the resonance bandwidth of the target resonator 133.

The source device 110 and the target device 120 communicate with each other to share information about the resonance bandwidth of the source resonator 131 and the resonance bandwidth of the target resonator 133. If power desired or needed by the target device 120 is greater than a reference value, the Q-factor $Q_S$ of the source resonator 131 may be set to be greater than 100. If the power desired or needed by the target device 120 is less than the reference value, the Q-factor $Q_S$ of the source resonator 131 may be set to less than 100.

In resonance-based wireless power transmission, a resonance bandwidth is a significant factor. If Qt indicates a Q-factor based on a change in a distance between the source resonator 131 and the target resonator 133, a change in a resonance impedance, impedance-mismatching, a reflected signal, or any other factor affecting a Q-factor, Qt is inversely proportional to a resonance bandwidth as expressed by the following Equation 1:

$$\frac{\Delta f}{f_0} = \frac{1}{Qt} \quad (1)$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between resonators, $BW_S$ denotes a resonance bandwidth of the source resonator 131, and $BW_D$ denotes a resonance bandwidth of the target resonator 133.

An efficiency U of wireless power transmission may be expressed by the following Equation 2:

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \quad (2)$$

In Equation 2, κ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonance frequency, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_\kappa$ denotes a Q-factor of energy coupling between the source resonator 131 and the target resonator 133.

As can be seen from Equation 2, the Q-factor has a great effect on an efficiency of the wireless power transmission. Accordingly, the Q-factor may be set to a high value to increase the efficiency of the wireless power transmission. However, even when $Q_S$ and $Q_D$ are set to high values, the efficiency of the wireless power transmission may be reduced by a change in the coupling coefficient κ of the energy coupling, a change in a distance between the source resonator 131 and the target resonator 133, a change in a resonance impedance, impedance mismatching, and any other factor affecting the efficiency of the wireless power transmission.

If the resonance bandwidths $BW_S$ and $BW_D$ of the source resonator 131 and the target resonator 133 are set to be too narrow to increase the efficiency of the wireless power transmission, impedance mismatching and other undesirable conditions may easily occur due to insignificant external influences. In order to account for the effect of impedance mismatching, Equation 1 may be rewritten as the following Equation 3:

$$\frac{\Delta f}{f_0} = \frac{\sqrt{VSWR} - 1}{Qt\sqrt{VSWR}} \quad (3)$$

In an example in which an unbalanced relationship of a resonance bandwidth or a bandwidth of an impedance matching frequency between the source resonator 131 and the target resonator 133 is maintained, a reduction in efficiency of a wireless power transmission may be prevented due to a change in the coupling coefficient κ, a change in the distance between the source resonator 131 and the target resonator 133, and/or a change in a resonance impedance and/or impedance mismatching. In an example in which the unbalanced relationship of the resonance bandwidth or the bandwidth of the impedance matching frequency between the source resonator 131 and the target resonator 133 is maintained, based on Equations 1 and 3, an unbalanced relationship between the Q-factors $Q_S$ and $Q_D$ may also be maintained.

The source device 110 wirelessly transmits wake-up power used to wake up the target device 120, and broadcasts a configuration signal used to configure a wireless power transmission network. The source device 110 further receives, from the target device 120, a search frame including a receiving sensitivity of the configuration signal, and may further permit a join of the target device 120. The source device 110 may further transmit, to the target device 120, an ID used to identify the target device 120 in the wireless power transmission network. The source device 110 may further generate the charging power through a power control, and may further wirelessly transmit the charging power to the target device 120.

The target device 120 receives wake-up power from at least one of source devices, and activates a communication function, using the wake-up power. The target device 120 further receives, from at least one of the source devices, a configuration signal used to configure a wireless power transmission network, and may further select the source device 110 based on a receiving sensitivity of the configuration signal. The target device 120 may further wirelessly receive power from the selected source device 110.

In the following description, the term "resonator" used in the discussion of FIGS. 2A through 4B refers to both a source resonator and a target resonator.

Figure 2B:
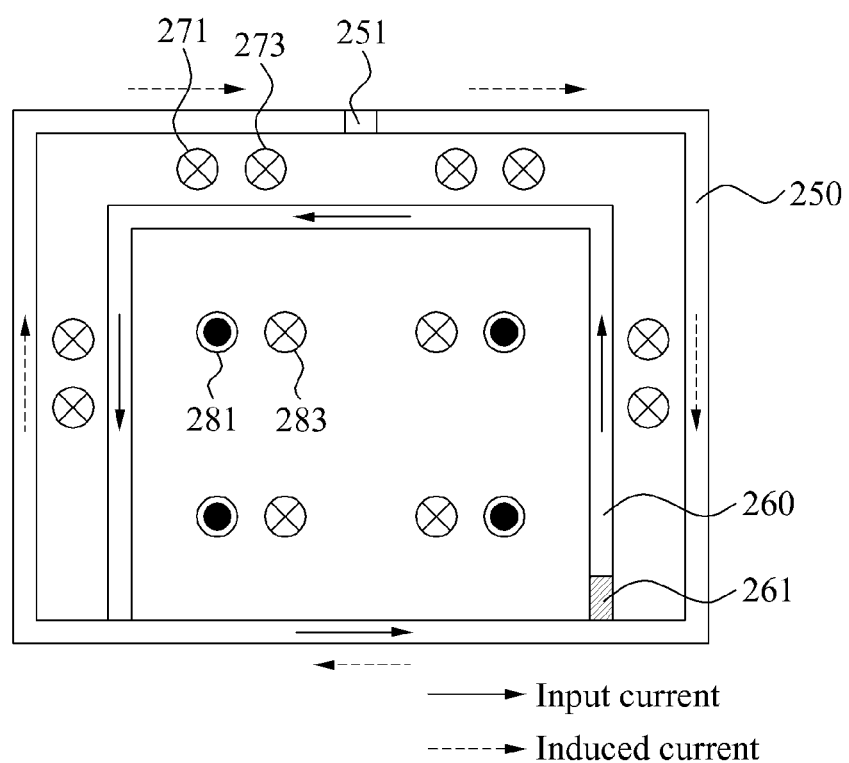

FIGS. 2A and 2B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 2A illustrates an example of a structure of a wireless power transmitter in which a feeder 210 and a resonator 220 do not have a common ground. Referring to FIG. 2A, as an input current flows into a feeder 210 through a terminal labeled "+" and out of the feeder 210 through a terminal labeled "−", a magnetic field 230 is formed by the input current. A direction 231 of the magnetic field 230 inside the feeder 210 is into the plane of FIG. 2A, and has a phase that is opposite to a phase of a direction 233 of the magnetic field 230 outside the feeder 210. The magnetic field 230 formed by the feeder 210 induces a current to flow in a resonator 220. The direction of the induced current in the resonator 220 is opposite to a direction of the input current in the feeder 210 as indicated by the dashed arrows in FIG. 2A.

The induced current in the resonator 220 forms a magnetic field 240. Directions of the magnetic field 240 are the same at all positions inside the resonator 220. Accordingly, a direction 241 of the magnetic field 240 formed by the resonator 220 inside the feeder 210 has the same phase as a direction 243 of the magnetic field 240 formed by the resonator 220 outside the feeder 210.

Consequently, when the magnetic field 230 formed by the feeder 210 and the magnetic field 240 formed by the resonator 220 are combined, a strength of the total magnetic field inside the resonator 220 decreases inside the feeder 210 and increases outside the feeder 210. In an example in which power is supplied to the resonator 220 through the feeder 210 configured as illustrated in FIG. 2A, the strength of the total magnetic field decreases in the center of the resonator 220, but increases outside the resonator 220. In another example in which a magnetic field is randomly distributed in the resonator 220, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 forms a magnetic field, and a current is induced in the resonator 250 by the magnetic field. Additionally, another magnetic field is formed by the induced current flowing in the resonator 250. In this example, a direction of the input current flowing in the feeder 260 has a phase opposite to a phase of a direction of the induced current flowing in the resonator 250. Accordingly, in a region between the resonator 250 and the feeder 260, a direction 271 of the magnetic field formed by the input current has the same phase as a direction 273 of the magnetic field formed by the induced current, and thus the strength of the total magnetic field increases in the region between the resonator 250 and the feeder 260. Conversely, inside the feeder 260, a direction 281 of the magnetic field formed by the input current has a phase opposite to a phase of a direction 283 of the magnetic field formed by the induced current, and thus the strength of the total magnetic field decreases inside the feeder 260. Therefore, the strength of the total magnetic field decreases in the center of the resonator 250, but increases outside the resonator 250.

An input impedance may be adjusted by adjusting an internal area of the feeder 260. The input impedance refers to an impedance viewed in a direction from the feeder 260 to the resonator 250. When the internal area of the feeder 260 is increased, the input impedance is increased. Conversely, when the internal area of the feeder 260 is decreased, the input impedance is decreased. Because the magnetic field is randomly distributed in the resonator 250 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 3A:
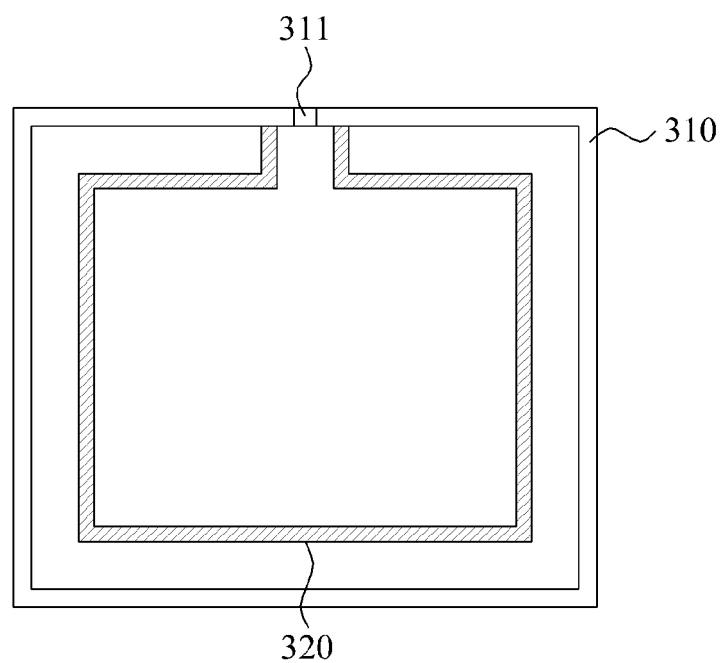
FIGS. 3A and 3B are diagrams illustrating an example of a wireless power transmission apparatus.
Figure 3B:
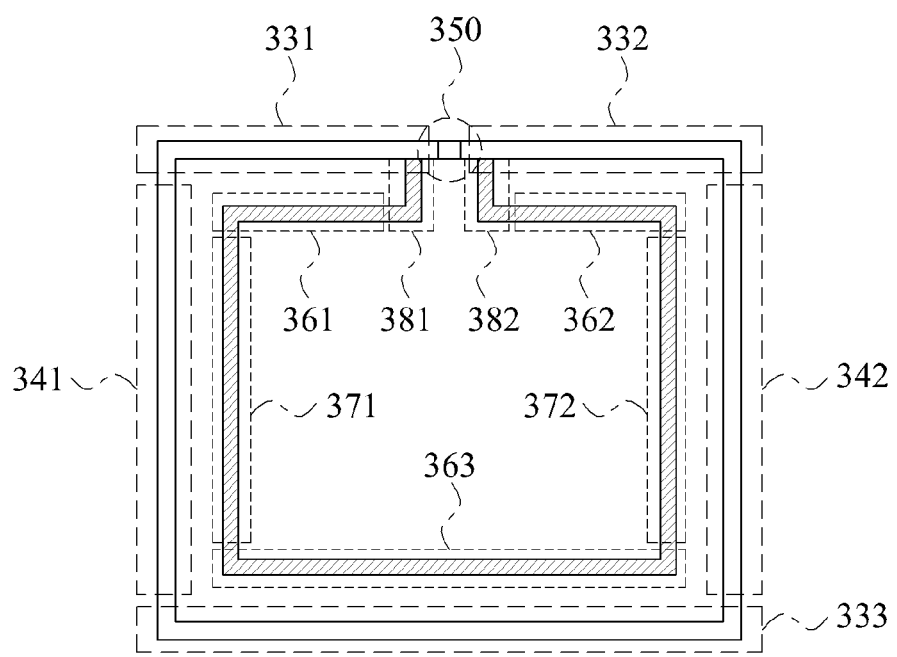

FIGS. 3A and 3B are diagrams illustrating an example of a feeding unit and a resonator of a wireless power transmitter. Referring to FIG. 3A, the wireless power transmitter includes a resonator 310 and a feeding unit 320. The resonator 310 further includes a capacitor 311. The feeding unit 320 is electrically connected to both ends of the capacitor 311.

FIG. 3B illustrates, in greater detail, a structure of the wireless power transmitter of FIG. 3A. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is inserted in series between a first signal conducting portion 331 and a second signal conducting portion 332, causing an electric field to be confined within the capacitor 350. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 3B is separated into two portions that will be referred to as the first signal conducting portion 331 and the second signal conducting portion 332. A conductor disposed in a lower portion of the first transmission line in FIG. 3B will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line, and includes the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

One end of the first signal conducting portion 331 is connected to one end of the first conductor 341, the other end of the first signal conducting portion 331 is connected to the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the ground conducting portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 350 inserted into the first transmission line may cause the resonator 310 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator 310, may have a zeroth order resonance characteristic of having a resonance frequency when a propagation constant is "0". If the MNG resonator 310 has the zeroth order resonance characteristic, the resonance frequency is independent of a physical size of the MNG resonator 310. By changing the capacitance of the capacitor 350, the resonance frequency of the MNG resonator 310 may be changed without changing the physical size of the MNG resonator 310.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 3B, a magnetic core passing through the MNG resonator 310 may be provided to increase a power transmission distance.

Referring to FIG. 3B, the feeding unit 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and includes a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

One end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel to both ends of the capacitor 350. The fifth conductor 381 and the sixth conductor 382 are used as an input port to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeding unit 320 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 381 or the sixth conductor 382, input current flows through the feeding unit 320 and the resonator 310, generating a magnetic field that induces a current in the resonator 310. A direction of the input current flowing through the feeding unit 320 is identical to a direction of the induced current flowing through the resonator 310, thereby causing a strength of a total magnetic field to increase in the center of the resonator 310, and decrease near the outer periphery of the resonator 310.

An input impedance is determined by an area of a region between the resonator 310 and the feeding unit 320. Accordingly, a separate matching network used to match the input impedance to an output impedance of a power amplifier may not be necessary. However, if a matching network is used, the input impedance may be adjusted by adjusting a size of the feeding unit 320, and accordingly a structure of the matching network may be simplified. The simplified structure of the matching network may reduce a matching loss of the matching network.

The second transmission line, the third conductor 371, the fourth conductor 372, the fifth conductor 381, and the sixth conductor 382 of the feeding unit may have a structure identical to the structure of the resonator 310. For example, if the resonator 310 has a loop structure, the feeding unit 320 may also have a loop structure. As another example, if the resonator 310 has a circular structure, the feeding unit 320 may also have a circular structure.

FIG. 4A is a diagram illustrating an example of a distribution of a magnetic field in a resonator that is produced by feeding of a feeding unit, of a wireless power transmitter. FIG. 4A more simply illustrates the resonator 310 and the feeding unit 320 of FIGS. 3A and 3B, and the names of the various elements in FIG. 3B will be used in the following description of FIG. 4A without reference numerals.

A feeding operation may be an operation of supplying power to a source resonator in wireless power transmission, or an operation of supplying AC power to a rectifier in wireless power transmission. FIG. 4A illustrates a direction of input current flowing in the feeding unit, and a direction of induced current flowing in the source resonator. Additionally, FIG. 4A illustrates a direction of a magnetic field formed by the input current of the feeding unit, and a direction of a magnetic field formed by the induced current of the source resonator.

Referring to FIG. 4A, the fifth conductor or the sixth conductor of the feeding unit 320 may be used as an input port 410. In FIG. 4A, the sixth conductor of the feeding unit is being used as the input port 410. An RF signal is input to the input port 410. The RF signal may be output from a power amplifier. The power amplifier may increase and decrease an amplitude of the RF signal based on a power requirement of a target device. The RF signal input to the input port 410 is represented in FIG. 4A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 4A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 4A, within the feeding unit, a direction 421 of the magnetic field generated by the input current flowing in the feeding unit is identical to a direction 423 of the magnetic field generated by the induced current flowing in the resonator. Accordingly, a strength of the total magnetic field may increases inside the feeding unit.

In contrast, as illustrated in FIG. 4A, in a region between the feeding unit and the resonator, a direction 433 of the magnetic field generated by the input current flowing in the feeding unit is opposite to a direction 431 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 4A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 4B:
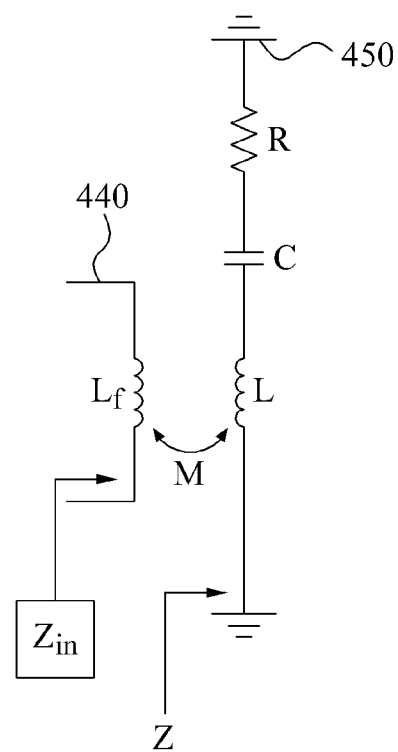
FIG. 4B is a diagram illustrating examples of equivalent circuits of a feeder and a resonator.

FIG. 4B is a diagram illustrating examples of equivalent circuits of a feeding unit and a resonator of a wireless power transmitter. Referring to FIG. 4B, a feeding unit 440 and a resonator 450 may be represented by the equivalent circuits in FIG. 4B. The feeding unit 440 is represented as an inductor having an inductance $L_f$, and the resonator 450 is represented as a series connection of an inductor having an inductance L coupled to the inductance $L_f$ of the feeding unit 440 by a mutual inductance M, a capacitor having a capacitance C, and a resistor having a resistance R. An example of an input impedance $Z_{in}$ viewed in a direction from the feeding unit 440 to the resonator 450 may be expressed by the following Equation 4:

$$Z_{in} = \frac{(\omega M)^2}{Z} \quad (4)$$

In Equation 4, M denotes a mutual inductance between the feeding unit 440 and the resonator 450, ω denotes a resonance frequency of the feeding unit 440 and the resonator 450, and Z denotes an impedance viewed in a direction from the resonator 450 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 440 and the resonator 450. The area of the region between the feeding unit 440 and the resonator 450 may be adjusted by adjusting a size of the feeding unit 440, thereby adjusting the mutual inductance M and the input impedance $Z_{in}$. Since the input impedance $Z_{in}$ may be adjusted by adjusting the size of the feeding unit 440, it may be unnecessary to use a separate matching network to perform impedance matching with an output impedance of a power amplifier.

In a target resonator and a feeding unit included in a wireless power receiver, a magnetic field may be distributed as illustrated in FIG. 4A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 4A, a direction of the induced current flowing in the target resonator will be identical to a direction of the induced current flowing in the feeding unit. Accordingly, for the reasons discussed above in connection with FIG. 4A, a strength of the total magnetic field will increase inside the feeding unit, and will decrease in a region between the feeding unit and the target resonator.

Figure 5:
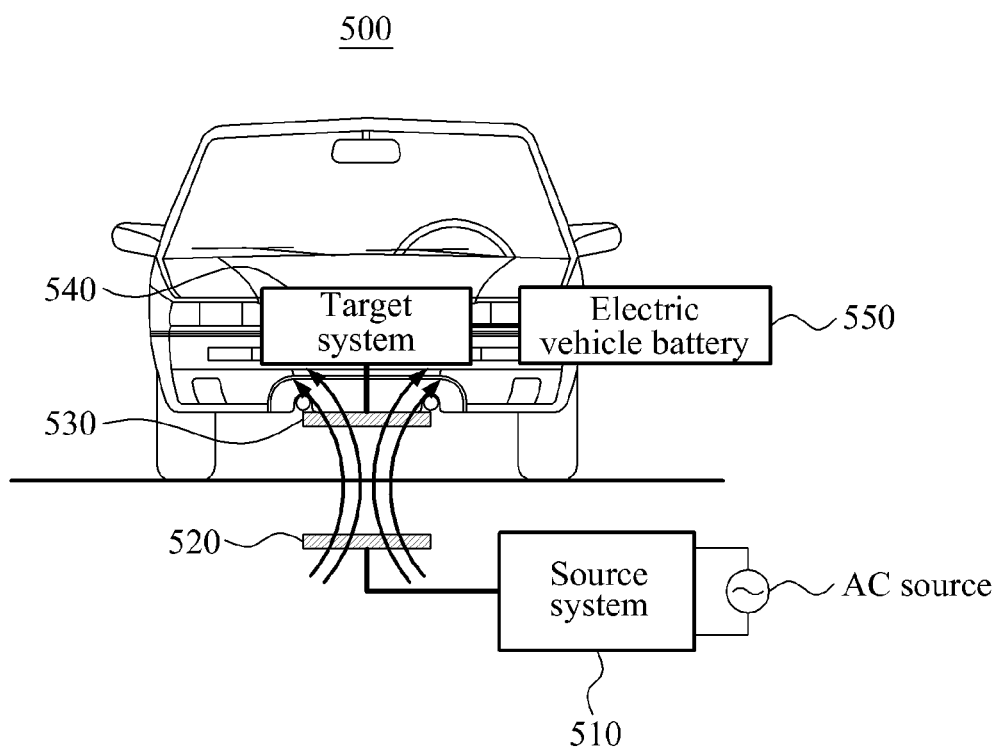
FIG. 5 is a diagram illustrating an example of an electric vehicle charging system.

FIG. 5 is a diagram illustrating an example of an electric vehicle charging system. Referring to FIG. 5, an electric vehicle charging system 500 includes a source system 510, a source resonator 520, a target resonator 530, a target system 540, and an electric vehicle battery 550.

In one example, the electric vehicle charging system 500 includes a structure similar to the structure of the wireless power transmission system of FIG. 1. The source system 510 and the source resonator 520 in the electric vehicle charging system 500 operate as a source. The target resonator 530 and the target system 540 in the electric vehicle charging system 500 operate as a target.

In one example, the source system 510 includes an alternating current-to-direct current (AC/DC) converter, a power detector, a power converter, a control and communication (control/communication) unit similar to those of the source device 110 of FIG. 1. In one example, the target system 540 includes a rectifier, a DC-to-DC (DC/DC) converter, a switch, a charging unit, and a control/communication unit similar to those of the target device 120 of FIG. 1. The electric vehicle battery 550 is charged by the target system 540. The electric vehicle charging system 500 may use a resonant frequency in a band of a few kHz to tens of MHz.

The source system 510 generates power based on a type of the vehicle being charged, a capacity of the electric vehicle battery 550, and a charging state of the electric vehicle battery 550, and wirelessly transmits the generated power to the target system 540 via a magnetic coupling between the source resonator 520 and the target resonator 530.

The source system 510 may control an alignment of the source resonator 520 and the target resonator 530. For example, when the source resonator 520 and the target resonator 530 are not aligned, the controller of the source system 510 may transmit a message to the target system 540 to control the alignment of the source resonator 520 and the target resonator 530.

For example, when the target resonator 530 is not located in a position enabling maximum magnetic coupling, the source resonator 520 and the target resonator 530 are not properly aligned. When a vehicle does not stop at a proper position to accurately align the source resonator 520 and the target resonator 530, the source system 510 may instruct a position of the vehicle to be adjusted to control the source resonator 520 and the target resonator 530 to be aligned. However, this is just an example, and other methods of aligning the source resonator 520 and the target resonator 530 may be used.

The source system 510 and the target system 540 may transmit or receive an ID of a vehicle and exchange various messages by performing communication with each other.

The descriptions of FIGS. 1 through 4B are also applicable to the electric vehicle charging system 500. However, the electric vehicle charging system 500 may use a resonant frequency in a band of a few kHz to tens of MHz, and may wirelessly transmit power that is equal to or higher than tens of watts to charge the electric vehicle battery 550.

Figure 6A:
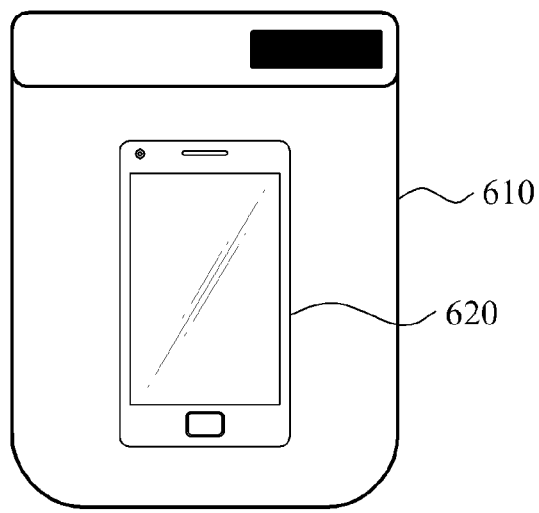
FIGS. 6A through 7B are diagrams illustrating examples of applications in which a wireless power reception apparatus and a wireless power transmission apparatus may be mounted.

FIGS. 6A through 7B are diagrams illustrating examples of applications in which a wireless power receiver and a wireless power transmitter are mounted. FIG. 6A illustrates an example of wireless power charging between a pad 610 and a mobile terminal 620, and FIG. 6B illustrates an example of wireless power charging between pads 630 and 640 and hearing aids 650 and 660, respectively.

Referring to FIG. 6A, a wireless power transmitter is mounted in the pad 610, and a wireless power receiver is mounted in the mobile terminal 620. The pad 610 charges a single mobile terminal, namely, the mobile terminal 620.

Figure 6B:
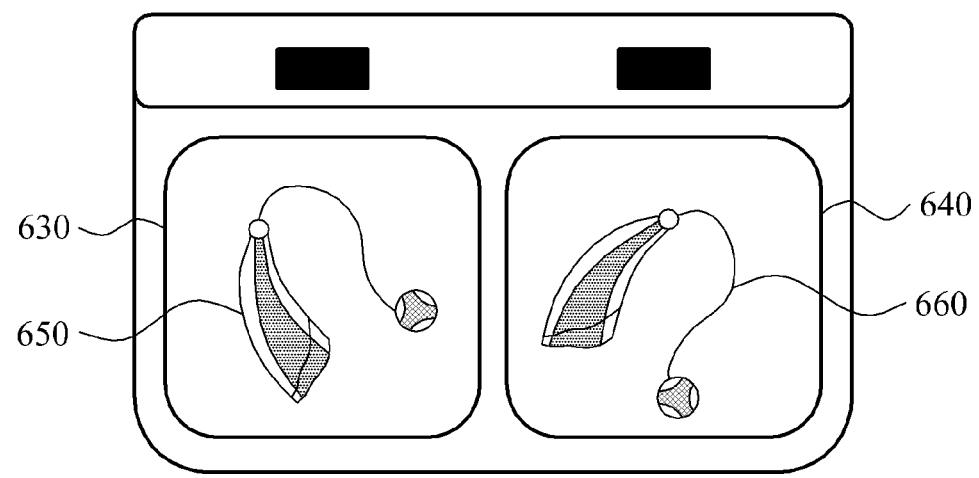

Referring to FIG. 6B, two wireless power transmitters are respectively mounted in the pads 630 and 640. The hearing aids 650 and 660 are used for a left ear and a right ear, respectively. Two wireless power receivers are respectively mounted in the hearing aids 650 and 660. The pads 630 and 640 charge two hearing aids, respectively, namely, the hearing aids 650 and 660.

Figure 7A:
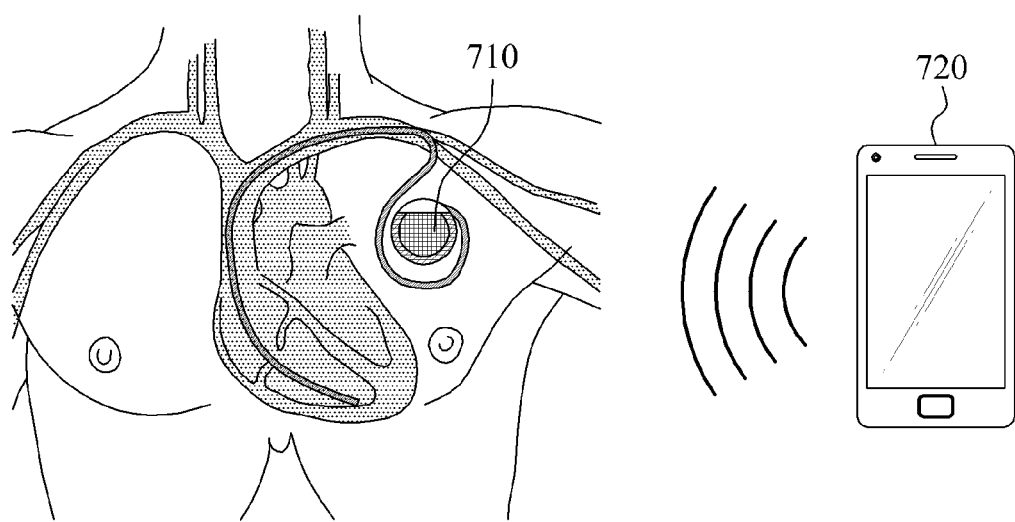
Figure 7B:
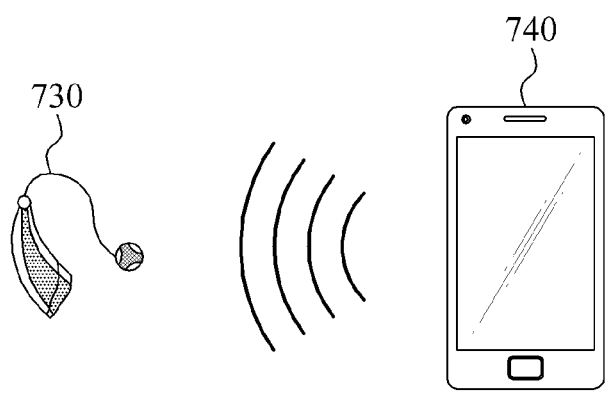

FIG. 7A illustrates an example of wireless power charging between an electronic device 710 inserted into a human body, and a mobile terminal 720. FIG. 7B illustrates an example of wireless power charging between a hearing aid 730 and a mobile terminal 740.

Referring to FIG. 7A, a wireless power transmitter and a wireless power receiver are mounted in the mobile terminal 720. Another wireless power receiver is mounted in the electronic device 710. The electronic device 710 is charged by receiving power from the mobile terminal 720.

Referring to FIG. 7B, a wireless power transmitter and a wireless power receiver are mounted in the mobile terminal 740. Another wireless power receiver is mounted in the hearing aid 730. The hearing aid 730 is charged by receiving power from the mobile terminal 740. Low-power electronic devices, for example, Bluetooth earphones, may also be charged by receiving power from the mobile terminal 740.

Figure 8:
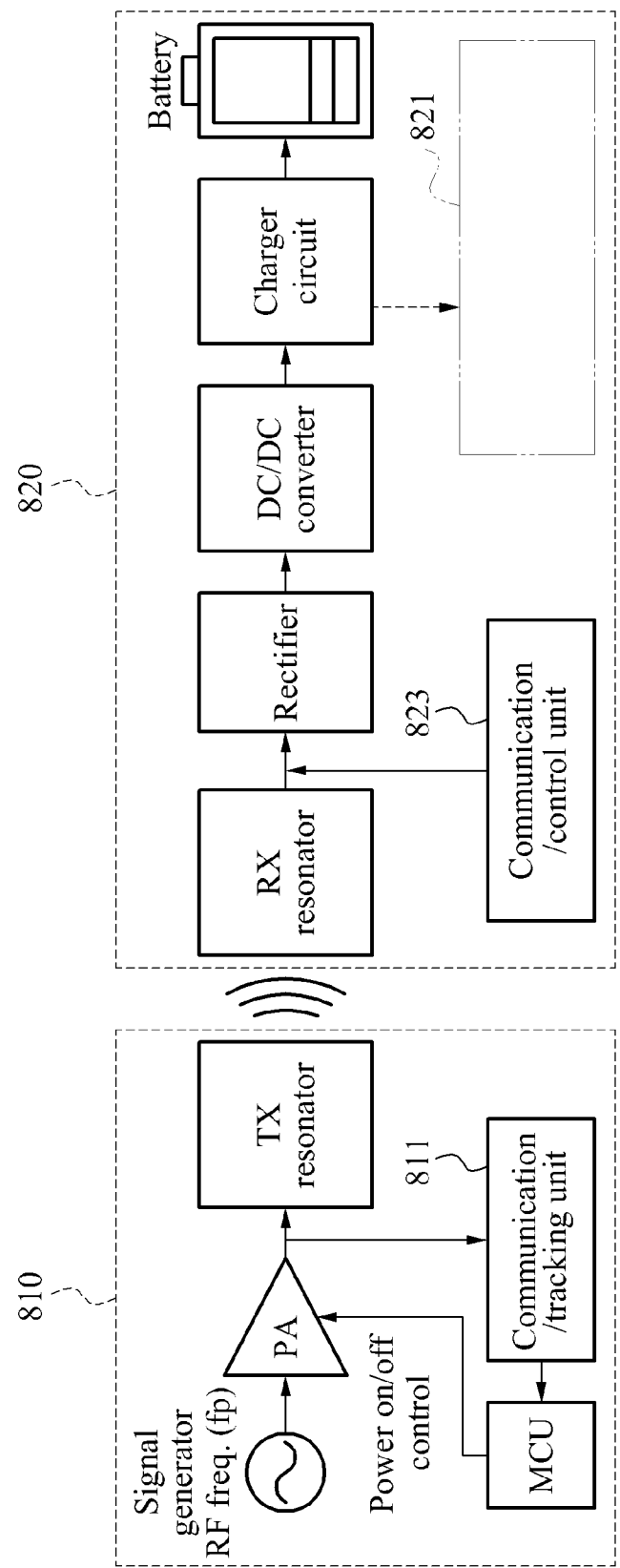
FIG. 8 is a diagram illustrating an example of a wireless power transmission apparatus and a wireless power reception apparatus.

FIG. 8 is a diagram illustrating another example of a wireless power transmission system. Referring to FIG. 8, a wireless power transmitter 810 may be mounted in each of the pad 610 of FIG. 6A and pads 630 and 640 of FIG. 6B. Additionally, the wireless power transmitter 810 may be mounted in each of the mobile terminal 720 of FIG. 7A and the mobile terminal 740 of FIG. 7B.

In addition, a wireless power receiver 820 may be mounted in each of the mobile terminal 620 of FIG. 6A and the hearing aids 650 and 660 of FIG. 6B. Further, the wireless power receiver 820 may be mounted in each of the electronic device 710 of FIG. 7A and the hearing aid 730 of FIG. 7B.

The wireless power transmitter 810 may include a similar configuration to the source device 110 of FIG. 1. For example, the wireless power transmitter 810 may include a unit configured to transmit power using magnetic coupling.

Referring to FIG. 8, the wireless power transmitter 810 includes a signal generator that generates a radio frequency (RF) frequency fp, a power amplifier (PA), a microcontroller unit (MCU), a source resonator, and a communication/tracking unit 811. The communication/tracking unit 811 communicates with the wireless power receiver 820, and controls an impedance and a resonance frequency to maintain a wireless power transmission efficiency. Additionally, the communication/tracking unit 811 may perform similar functions to the communication unit 115 of FIG. 1.

The wireless power receiver 820 may include a similar configuration to the target device 120 of FIG. 1. For example, the wireless power receiver 820 may include a unit configured to wirelessly receive power and to charge a battery.

Referring to FIG. 8, the wireless power receiver 820 includes a target resonator, a rectifier, a DC/DC converter, a charger circuit, and a communication/control unit 823. The communication/control unit 823 communicates with the wireless power transmitter 810, and performs an operation to protect overvoltage and overcurrent.

The wireless power receiver 820 may include a hearing device circuit 821. The hearing device circuit 821 may be charged by a battery. The hearing device circuit 821 may include, for example, a microphone, an analog-to-digital converter (ADC), a processor, a digital-to-analog converter (DAC), and/or a receiver. For example, the hearing device circuit 821 may include the same configuration as a hearing aid.

Figure 9A:
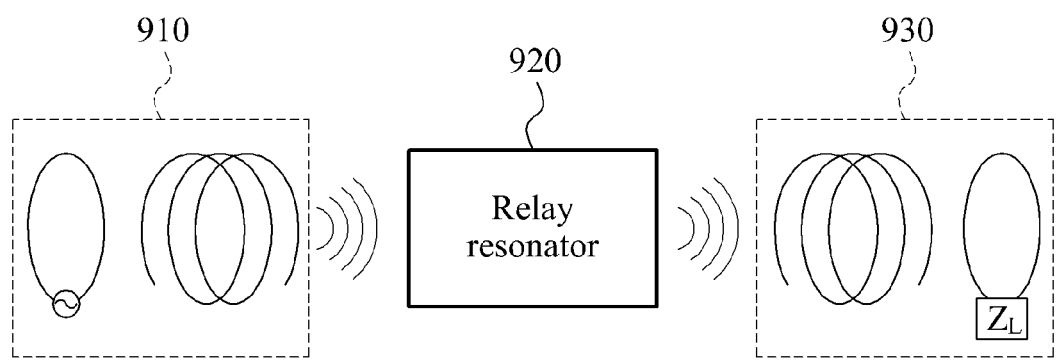
FIGS. 9A and 9B are diagrams illustrating examples of a wireless power transmission system including a relay resonator.
Figure 9B:
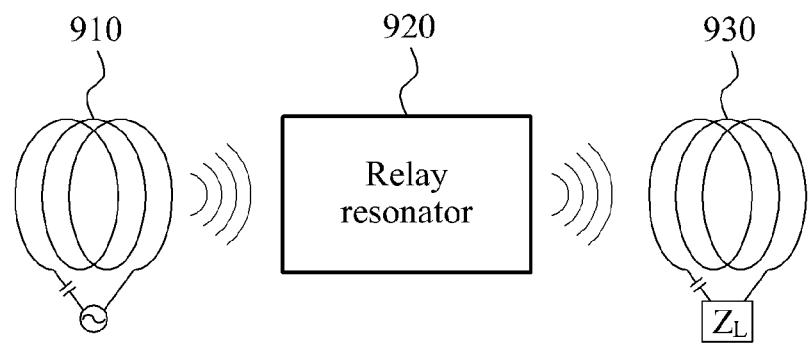

FIGS. 9A and 9B illustrate examples of a wireless power transmission system including a relay resonator 920. Power may be wirelessly transmitted at a high efficiency, using the relay resonator 920 with a high quality factor. For example, the wireless power transmission system includes a source resonator 910, a target resonator 930, and the relay resonator 920. The source resonator 910 wirelessly transmits power, and the target resonator 930 wirelessly receives the power. The relay resonator 920 relays power from the source resonator 910 to the target resonator 930 through a mutual resonance, and a quality factor of the relay resonator 920 may be higher than a quality factor of each of the source resonator 910 and the target resonator 930. The quality factor may have a similar meaning to the above-described Q-factor.

A wireless power transmission-related technology for supplying power without using a wire may be provided. Wireless power transmission may provide an environment enabling charging regardless of a time and a location. For example, a power source may be shared between apparatuses, even when a separate power source is absent.

Through the above wireless power transmission, energy may be easily supplied to a wired charging system. Additionally, nature and environments may be prevented from being contaminated due to waste batteries and the like. In an example, in a mobile environment, long-distance charging at a high efficiency, using a small-sized source resonator and a small-sized target resonator, may be needed. In this example, a relay resonator located between the source resonator and the target resonator may be used to efficiently wirelessly transmit power.

In an example in which a quality factor of each of the source resonator 910 and the target resonator 930 is lower than a predetermined threshold, for example "100", an efficiency of wireless power transmission may be lower than a predetermined efficiency, for example 60% in a distance of 2 meters (m). For example, when a quality factor of each of the source resonator 910 and the target resonator 930 is lower than a predetermined threshold, wireless power transmission may be impossible in a distance longer than a predetermined distance, due to a low efficiency of the wireless power transmission. When the relay resonator 920 is used, power may be wirelessly transmitted between the source resonator 910 and the target resonator 930 in a longer distance and a higher efficiency, compared to when the relay resonator 920 is not used.

In FIGS. 9A and 9B, the source resonator 910 employing a magnetic resonance scheme may include a source coil and a TX coil. Additionally, the target resonator 930 may include a load coil and an RX coil.

The wireless power transmission system of FIG. 9A includes a single RX coil and a single TX coil of the magnetic resonance scheme. In the wireless power transmission system of FIG. 9A, the relay resonator 920 has a high quality factor, and is located between the source resonator 910 and the target resonator 930. A source coil and the TX coil may be connected to each other through a parasitic capacitance, and a load coil and the RX coil may also be connected to each other through a parasitic capacitance.

In the wireless power transmission system of FIG. 9B, the relay resonator 920 has a high quality factor, and is located between the source resonator 910 and the target resonator 930. In FIG. 9B, the source resonator 910 may be connected to a source through a lumped capacitor, and the target resonator 930 may also be connected to a load $Z_L$ through a lumped capacitor. For example, at least one relay resonator with a high quality factor may be included in the wireless power transmission system. As illustrated in FIGS. 9A and 9B, a single relay resonator, namely, the relay resonator 920, wirelessly relays power from the source resonator 910 to the target resonator 930.

Figure 10:
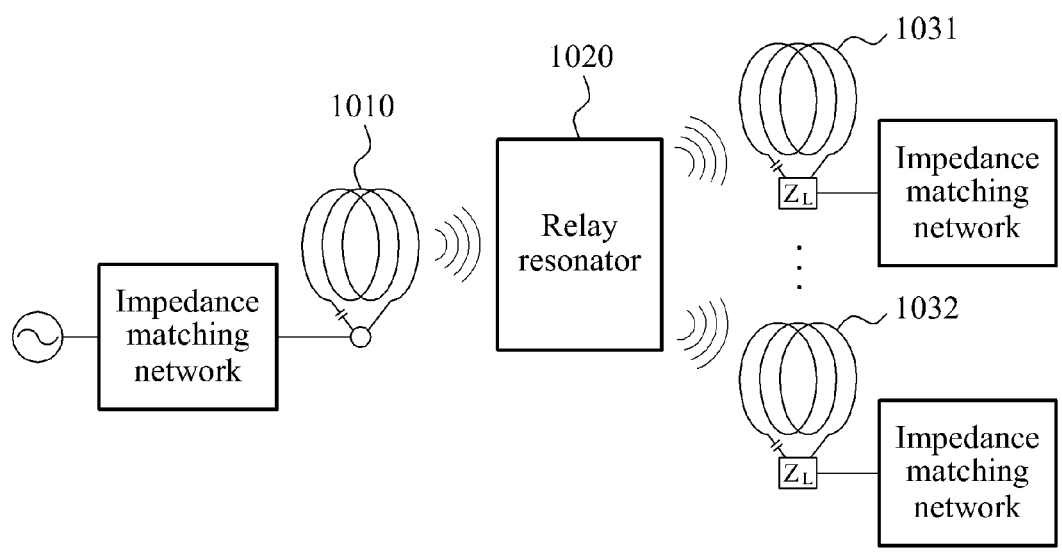
FIG. 10 is a diagram illustrating an example of a wireless power transmission system including a source resonator and two or more target resonators that are connected to impedance matching networks.

FIG. 10 illustrates an example of a wireless power transmission system including a source resonator 1010 and two or more target resonators that are connected to impedance matching networks. Referring to FIG. 10, the two or more target resonators, for example, target resonators 1031 and 1032, are connected to impedance matching networks. For example, magnetic fields generated by the source resonator 1010 are transferred to the target resonators 1031 and 1032 through a relay resonator 1020. In this example, apparatuses connected to the target resonators 1031 and 1032 may be wirelessly charged through the magnetic fields. To wirelessly transmit power at a maximum efficiency, the impedance matching networks perform impedance matching between the source resonator 1010 and the target resonators 1031 and 1032.

Figure 11:
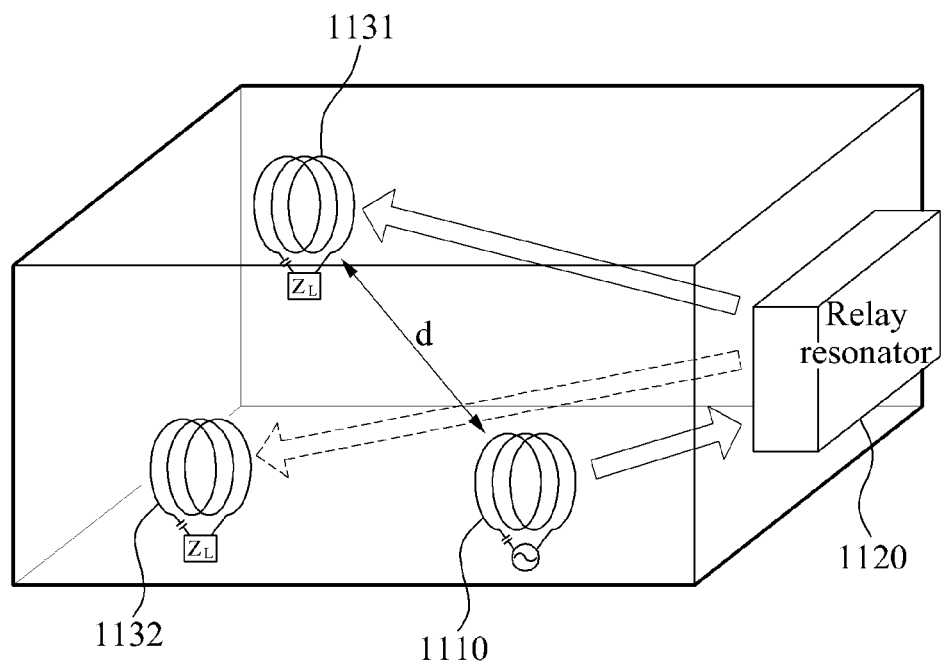
FIG. 11 is a diagram illustrating an example of a wireless power relay apparatus.

FIG. 11 illustrates an example of a wireless power relay apparatus. In an example in which a distance "d" between a source resonator 1110 and a target resonator 1131 is greater than or equal to a predetermined distance, when a quality factor of each of the source resonator 1110 and the target resonator 1131 is lower than a predetermined threshold, wireless power transmission may be impossible or inefficient. For example, a relay resonator 1120 designed to have a high quality factor may be located inside a wall surface, or on a wall surface within a predetermined space.

The above-described quality factor may have a value enabling the relay resonator 1120 to mutually resonate with the source resonator 1110 and the target resonator 1131 at an efficiency that is greater than or equal to a predetermined efficiency when a quality factor of at least one of the source resonator 1110 and the target resonator 1131 is lower than a predetermined threshold, for example, "100". The predetermined efficiency may be a power transmission efficiency that is greater than or equal to a predetermined value, for example, 60%, when a distance between the source resonator 1110 and the target resonator 1131 is less than a predetermined distance, for example, 2 m.

In an example in which a quality factor of the relay resonator 1120 is lower than a quality factor of at least one of the source resonator 1110 and the target resonator 1131, an efficiency of wireless power transmission through the relay resonator 1120 may be reduced. For example, when the source resonator 1110, the target resonator 1131, and the relay resonator 1120 have quality factors of "200", "100", and "100", respectively, a transmission efficiency between the source resonator 1110 and the relay resonator 1120 may be about 90%, and a transmission efficiency between the relay resonator 1120 and the target resonator 1131 may be about 70%. In this example, a total efficiency of a wireless power transmission system may be reduced to about 60%. When a quality factor of each of the source resonator 1110 and the target resonator 1131 is lower than a predetermined threshold, for example "100", the efficiency of wireless power transmission may be noticeably reduced.

In another example in which the quality factor of the relay resonator 1120 is higher than, for example, at least twice higher than, the quality factor of each of the source resonator 1110 and the target resonator 1131, the efficiency of wireless power transmission through the relay resonator 1120 may be improved. For example, when the source resonator 1110, the target resonator 1131, and the relay resonator 1120 have quality factors of "100", "100", and "200", respectively, a transmission efficiency between the source resonator 1110 and the relay resonator 1120, and a transmission efficiency between the relay resonator 1120 and the target resonator 1131, may be about 90%. In this example, the total efficiency of the wireless power transmission system may be about 80%. The efficiency of wireless power transmission may be maintained, or enhanced, even when a quality factor of each of the source resonator 1110 and the target resonator 1131 is lower than a predetermined threshold, for example, "100".

In still another example in which the quality factor of the relay resonator 1120 is sufficiently high, a transmission efficiency between the source resonator 1110, the relay resonator 1120 and the target resonator 1131 may increase generally. The relay resonator 1120 may be designed to have a high quality factor, and accordingly, a transmission efficiency of the wireless power transmission system may be improved. Additionally, the wireless power transmission system may efficiently wirelessly transmit power, despite a relatively long distance between the source resonator 1110 and the target resonator 1131.

Additionally, power may be efficiently wirelessly transmitted through the relay resonator 1120 having a high quality factor, despite a low quality factor of each of the source resonator 1110 and the target resonator 1131. In an example in which the source resonator 1110 and the target resonator 1131 are mounted in an actual application, for example, an electric vehicle, a hearing aid, and the like, the quality factor of each of the source resonator 1110 and the target resonator 1131 may be remarkably reduced, for example, reduced to be less than or equal to "50". In this example, the relay resonator 1120 may also relay power between the source resonator 1110 and the target resonator 1131, at a high efficiency.

As described above, when a quality factor of each of the source resonator 1110 and the target resonator 1131, and a distance between the source resonator 1110 and the target resonator 1131, are unsuitable for direct wireless power transmission, a wireless power relay apparatus including the relay resonator 1120 may relay power. For example, as the quality factor of the relay resonator 1120 increases, a transmission efficiency for the source resonator 1110 and a target resonator 1132 may increase. In this example, the source resonator 1110 and the target resonator 1132 may be spaced further apart, or may each have a relatively low quality factor.

The source resonator 1110 functioning as a source, and the target resonator 1131, to which power is to be wirelessly transmitted, may be located three-dimensionally in space, or may be two-dimensionally located. Additionally, the relay resonator 1120 may relay power between a single source resonator 1110 and the target resonator 1131, or between a plurality of source resonators 1110 and a plurality of target resonators 1131 and 1132, as illustrated in FIG. 11. For example, the source resonator 1110 and the target resonators 1131 and 1132 may perform impedance matching, in the same manner as illustrated in FIG. 10.

In an example in which a quality factor of the relay resonator 1120 configured to relay power from the source resonator 1110 to the target resonator 1131 through a mutual resonance is higher than a quality factor of each of the source resonator 1110 and the target resonator 1131, a transmission efficiency may be enhanced as described above. In this example, at least one of a material, a structure and a size of the relay resonator 1120 may have a high quality factor, compared to the source resonator 1110 and the target resonator 1131. For example, the quality factor of the relay resonator 1120 may be increased by increasing a size of a coil including a conductor, a thickness of the coil, and/or a number of turns of the coil.

The relay resonator 1120 may be configured as illustrated in FIGS. 12A through 15 below.

Figure 12A:
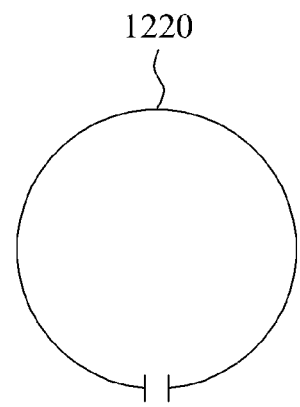
FIGS. 12A through 12C are diagrams illustrating examples of a relay resonator designed to have a high quality factor.
Figure 12B:
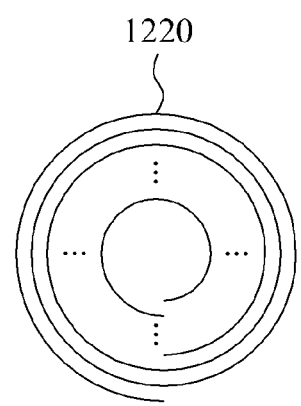
Figure 12C:
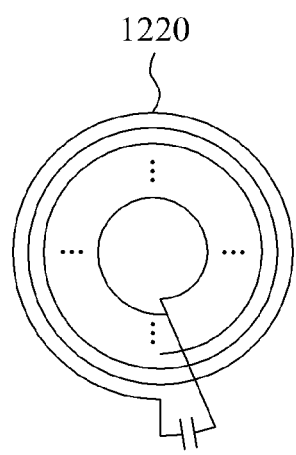

FIGS. 12A through 12C illustrate examples of a relay resonator 1220 designed to have a high quality factor. The relay resonator 1220 of FIG. 12A has a structure in which a single coil and a capacitor are combined. The relay resonator 1220 of FIG. 12B has a structure including a multi-coil. The relay resonator 1220 of FIG. 12C has a structure in which a multi-coil and a capacitor are combined. For example, the multi-coil may have at least two turns in a spiral shape. Each of the relay resonators 1220 may include a coil with a larger number of turns than a number of turns of a coil included in each of a source resonator and a target resonator, and accordingly, may have a high quality factor.

Figure 13:
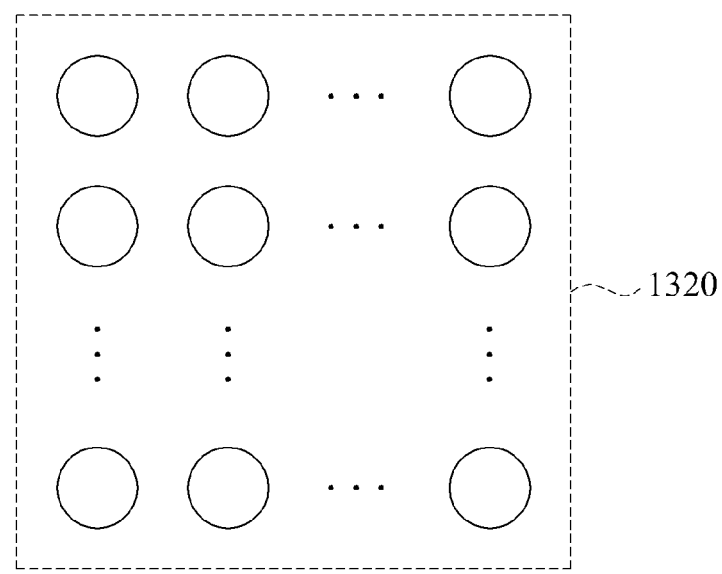
FIG. 13 is a diagram illustrating an example of a relay resonator including a multi-array resonator with a high quality factor.

FIG. 13 illustrates an example of a relay resonator 1320 including a multi-array resonator with a high quality factor. The single coil and the multi-coil of FIGS. 12A through 12C may be configured in a form of a multi-array, as illustrated in FIG. 13. The relay resonator 1320 of FIG. 13 may include, for example, a resonator in which coils configured as illustrated in FIG. 12A are arranged in the same plane in a multi-array.

The relay resonator 1320 may include a multi-array resonator including a plurality of resonators. The plurality of resonators may be electrically connected based on a magnetic field formed between the plurality of resonators, instead of being physically connected to each other. For example, a magnetic field may be formed between the plurality of resonators so that an electric field may be formed in the same direction.

In an example, the plurality of resonators in the relay resonator 1320 may be arranged in a single array or a multi-array between the source resonator and the target resonator. In this example, a form of an array may include an arrangement of the plurality of resonators in the same axis or in different axes. The plurality of arranged resonators may be connected to each other through a magnetic field, as described above.

Figure 14:
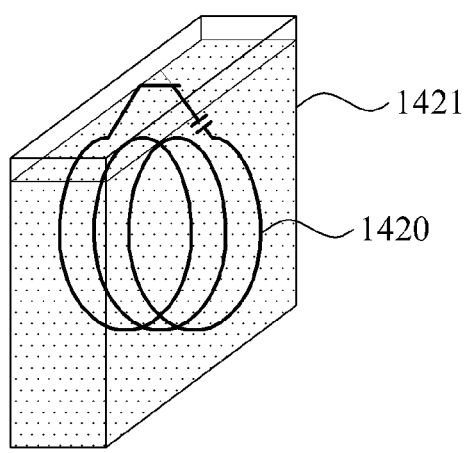
FIG. 14 is a diagram illustrating an example of a relay resonator designed with a material having a high quality factor.

FIG. 14 illustrates an example of a relay resonator 1420 designed with a material having a high quality factor. The relay resonator 1420 of FIG. 14 may be designed with a material having a higher quality factor than a material of each of a source resonator and a target resonator. Due to a material of a predetermined conductor of the relay resonator 1420, a quality factor of the relay resonator 1420 may be higher than a quality factor of each of the source resonator and the target resonator.

The material used for the relay resonator 1420 may have a low loss and a high conductivity, compared to a material used for each of the source resonator and the target resonator. A material of a conductor of the relay resonator 1420 may include, for example, gold, silver, copper, aluminum, grapheme, or a combination thereof. Additionally, a superconductor may be used as a material of the relay resonator 1420.

In an example, a low-loss material used for a conductor of the relay resonator 1420 may have a low resistance, or a high conductivity, compared to a material used for each of the source resonator and the target resonator. For example, the relay resonator 1420 may be configured as illustrated in FIGS. 12A and 13, using the above low-loss material.

In another example, the relay resonator 1420 may include a superconductive material, and may have a higher quality factor than a quality factor of each of the source resonator and the target resonator. For example, a coil of the relay resonator 1420 may include a superconducting wire. In this example, the relay resonator 1420 further includes a cooler 1421 configured to cool the relay resonator 1420, to maintain a superconductive property of the relay resonator 1420.

A superconductive material may have a zero electric resistance and thus, have a high quality factor. In an example of a high quality factor, a wireless power transmission efficiency of the relay resonator 1420 may increase, and a distance the relay resonator 1420 may transmit power through a mutual resonance with the source resonator and the target resonator may be lengthened. As a superconductive material, a high-temperature superconductor (HTS) or a room-temperature superconductor may be used.

In an example in which the relay resonator 1420 includes a high-temperature superconductive material, maintaining a temperature to be close to an absolute temperature of 77 kelvin (K) may be needed to maintain the superconductive property of the relay resonator 1420. The relay resonator 1420 may maintain, using the cooler 1421, the temperature to be close to the absolute temperature of 77 K.

In another example in which the relay resonator 1420 includes a room-temperature superconductive material, the superconductive property of the relay resonator 1420 may also be maintained at room temperature. Accordingly, the relay resonator 1420 may have a high quality factor, although the cooler 1421 is absent.

In the HTS, voltage may not drop, due to a perfect conductivity. Additionally, because penetration of an exterior magnetic field may be restrained due to a perfect diamagnetism, the HTS may not be affected by the exterior magnetic field. In addition, the HTS may not generate a magnetic field.

To cool the HTS, a container in which a refrigerant is stored may be disposed in the cooler 1421. As the refrigerant, a cryogenic coolant, for example, liquid nitrogen, liquid neon, and the like, may be used. The container may include, for example, a liquid nitrogen storage tank, a cooling means used to cool a heated refrigerant, and the like.

The cooling means may be used to recondense a coolant evaporated in a storage tank. The cooling means may typically include a closed circuit in which a working medium, for example, helium gas, is compressed in a compressor and expanded again in a cooling unit, and, as a result, cooling power may be supplied to a coolant included in the storage tank. The cooling means may operate, for example, according to the Gifford McMahon principle, a pulse tube principle, or the Stirling principle.

The Joule-Thomson effect may be desirably used for the container. The Joule-Thomson effect describes that a temperature further decreases after expansion when a pressure is reduced by setting a pressure of an inlet line to be higher than a pressure of an outlet line. In maintenance of the container, liquid nitrogen may be replaced with a separate liquid nitrogen tank to enable simple repairs of the container.

Because the HTS may have a zero electric resistance, lossless power transmission may be possible. Thus, a voltage drop may be prevented.

Coated conductors, also referred to as "second generation superconductors," may typically have long lengths that may be determined, for example, based on a level required during manufacturing of a resonator. Each of coated conductors may include a substrate to which a multi-layer structure including an HTS layer is applied, and at least one buffer layer disposed between the substrate and the HTS layer. The at least one buffer layer may be manufactured with a ceramic material having a great resistance. The at least one buffer layer may operate to compensate for various different properties of materials to be used. For example, to prevent the HTS layer from being contaminated with components of the substrate that may disperse toward the HTS layer, the at least one buffer layer may be provided.

As the high-temperature superconductive material, a ceramic oxide high-temperature superconductive material or magnesium diboride ($MgB_2$) may be used. The ceramic oxide high-temperature superconductive material may be selected from a group consisting of bismuth-based, thallium-based, yttrium-based, and mercury-based ceramic oxide superconductors.

Typical examples may include ceramic oxide HTSs based on Bi-Ae-Cu-Oy, (Bi, Pb)-Ae-Cu-Oy, Re-Ae-Cu-Oy, (Tl, Pb)-Ae-Cu—O, or Hg-Ae-Cu-Oy. In each of the above formulas, y denotes a relative oxygen content in a range suitable for a predetermined superconductive material, Ae denotes at least one alkaline earth element, for example, barium (B a), calcium (Ca), and/or strontium (Sr), and Re denotes at least one rare earth element, for example, yttrium (Y), or a combination of at least two of Y, lanthanum (La), lutetium (Lu), scandium (Sc), cerium (Ce), neodymium (Nd), and ytterbium (Yb).

Alternatively, precursors of superconductor materials may be used. The precursors may be mixtures of oxides that collectively have the same nominal composition as the superconductor materials, and may form a superconductor material upon heating.

Additionally, ceramic oxide HTSs may include HTSs known by references of bismuth strontium calcium copper oxide (BSCCO)-2212 and BSCCO-2223, and HTSs known by references of yttrium barium copper oxide (YBCO)-123 and YBCO-211. The numerical combinations 2212 and 2223 stand for stoichiometric ratios of Bi, Sr, Ca and copper (Cu). The portion of Bi may be substituted with lead (Pb), and the numerical combinations 123 and 211 stand for stoichiometric ratios of Y, Ba and Cu.

In addition, a ceramic oxide superconductive material may be, for example, a rare earth barium cuprate type-superconductor of a formula ReBaCuOy. In the formula, Re and y may be defined as described above.

A room-temperature superconductor refers to a material operating as a superconductor in room temperature, and may be generated by a scheme of additionally injecting a high-concentration electron into graphite powder. For example, by mixing distilled water with graphite powder with a length of tens of micrometers and a thickness of tens of nanometers, and by drying the mixture at 100° C., a gap between a graphite flake and a neighboring graphite flake may be filled with a high-concentration electron. Consequently, a room-temperature superconductor may be generated.

The relay resonator 1420 may increase a quality factor, using a magnetic material existing near a resonator, in addition to the materials and structures described above with reference to FIGS. 12A through 14. For example, the relay resonator 1420 may be enclosed by a magnetic material, and accordingly, a quality factor of the relay resonator 1420 may be higher than a quality factor of each of the source resonator and the target resonator. A magnetic material, for example, a ferrite sheet, may be coated as a shielding material around the relay resonator 1420. In an example in which the relay resonator 1420 is implemented in a solid component, such as a wall, a transmission efficiency may be reduced, due to coupling between the relay resonator 1420 and an implementing environment. However, the magnetic material may be used to shield coupling to the implementing environment.

Figure 15A:
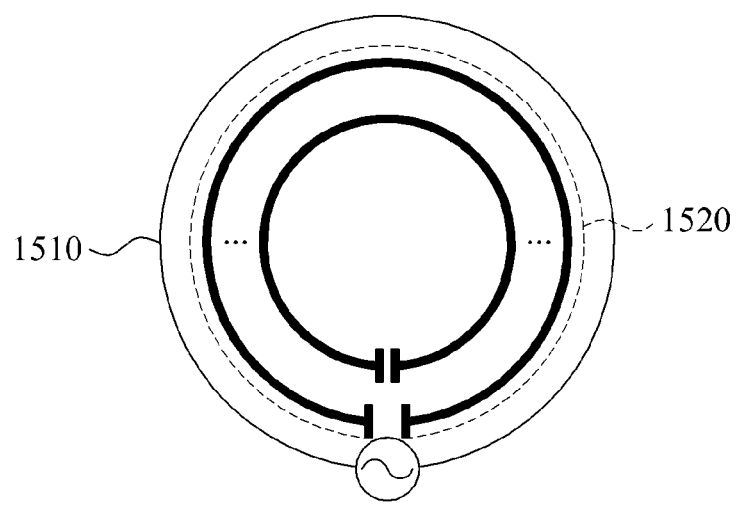
FIGS. 15A through 15B are diagrams illustrating examples of a relay resonator including a parasitic resonator disposed inside and outside a source resonator.
Figure 15B:
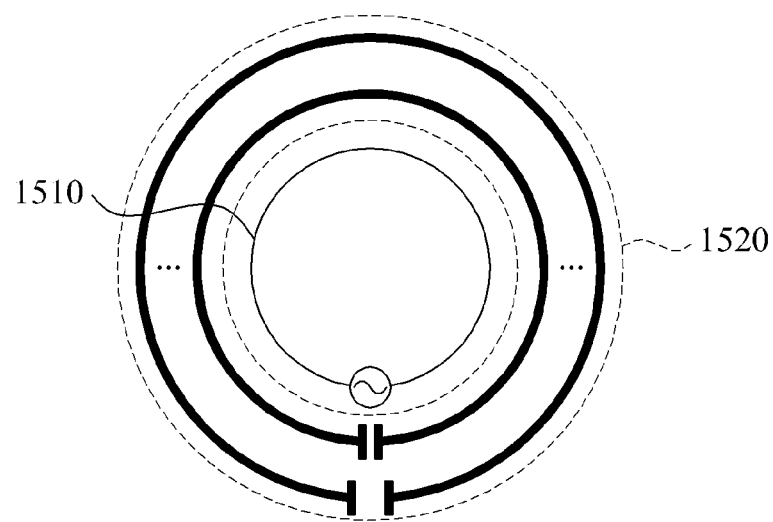

FIGS. 15A and 15B illustrate examples of a relay resonator including a parasitic resonator 1520. In FIG. 15A, the parasitic resonator 1520 is disposed inside a source resonator 1510. In FIG. 15B, the parasitic resonator 1520 is disposed outside the source resonator 1510. The relay resonator may form parasitic coupling to at least one of the source resonator 1510 and a target resonator. For example, the parasitic resonator 1520 in the relay resonator may be disposed in the same plane as at least one of the source resonator 1510 and the target resonator, and may form parasitic coupling to at least one of the source resonator 1510 and the target resonator. The parasitic resonator 1520 may include, for example, a variable capacitor having a variable characteristic, for example, a capacitance capacity and the like.

The parasitic resonator 1520 in the relay resonator may be in the same axis as at least one of the source resonator 1510 and the target resonator. In this example, the parasitic resonator 1520 may include at least one resonator disposed at least one of inside and outside at least one of the source resonator 1510 and the target resonator.

In an example, as illustrated in FIG. 15A, the parasitic resonator 1520 includes at least one resonator disposed in the same plane inside the source resonator 1510 or the target resonator. In this example, the parasitic resonator 1520 may form parasitic coupling to the source resonator 1510 or the target resonator on the same plane, and a quality factor of the parasitic resonator 1520 may be higher than a quality factor of each of the source resonator 1510 and the target resonator.

In another example, as illustrated in FIG. 15B, the parasitic resonator 1520 includes at least one resonator disposed in the same plane outside the source resonator 1510 or the target resonator. The source resonator 1510 or the target resonator may be located in an innermost side of the relay resonator of FIG. 15B. In this example, a quality factor of the parasitic resonator 1520 may be higher than a quality factor of each of the source resonator 1510 and the target resonator.

A material of the parasitic resonator 1520 may have a low loss and a high conductivity, compared to a material used for the source resonator 1510 and the target resonator, as described above with reference to FIG. 14. Additionally, the parasitic resonator 1520 may be designed with a structure having a high quality factor, compared to the source resonator 1510 and the target resonator, as described above with reference to FIGS. 12A through 13. For example, to have a higher quality factor, the parasitic resonator 1520 may have a large size, a large number of turns of a coil, or a thick coil, compared to the source resonator 1510 and the target resonator.

In still another example, the parasitic resonator 1520 may include at least two resonators that are disposed inside and outside each of the source resonator 1510 and the target resonator on the same plane. For example, at least one resonator may be disposed inside each of the source resonator 1510 and the target resonator, and at least one resonator may be disposed outside each of the source resonator 1510 and the target resonator. In this example, the parasitic resonator 1520 including the at least two resonators may have a higher quality factor than a quality factor of each of the source resonator 1510 and the target resonator.

As described above, according to various examples, in a wireless power transmission system, a material and a structure of a relay resonator may be designed to have a high quality factor, and thus, it is possible to wirelessly transmit power at a high efficiency even in a long distance. Additionally, according to various examples, in a short-distance resonance type wireless power transmission system, it is possible to transfer power at a high efficiency, using a relay resonator that may have a high quality factor, and that may be located between a source resonator and a target resonator, or in the same plane as the source resonator and the target resonator.

Furthermore, according to various examples, by using a relay resonator having a high quality factor, it is possible to maintain or enhance an efficiency, despite a source resonator and a target resonator being reduced in size in the same distance, compared to when the relay resonator has a low quality factor. Additionally, it is possible to maintain or enhance an efficiency of wireless power transmission, despite an increase in an align angle between a central axis of a source resonator and a central axis of a target resonator.

Moreover, according to various examples, a relay resonator having a high quality factor may be applied to a small source resonator and a small target resonator, and to a long distance between resonators. In addition, the relay resonator may also be used for home appliances for wireless charging, and IT products.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power relay apparatus, comprising:
    a plurality of relay resonators, each relay resonator of the plurality of relay resonators configured to relay power from a source resonator configured to wirelessly transmit the power to a target resonator configured to wirelessly receive the power through a mutual resonance, and at least one relay resonator among the plurality of relay resonators having a higher quality factor than the target resonator.

2. The wireless power relay apparatus of claim 1, wherein the at least one relay resonator is configured to form a parasitic coupling to either one or both of the source resonator and the target resonator.

3. The wireless power relay apparatus of claim 1, wherein the at least one relay resonator is disposed on the same plane as either one or both of the source resonator and the target resonator.

4. The wireless power relay apparatus of claim 1, wherein:
    the at least one relay resonator comprises a multi-array resonator comprising resonators; and
    the resonators are electrically connected to each other based on a magnetic field formed between the resonators.

5. The wireless power relay apparatus of claim 1, wherein a size of the at least one relay resonator is larger than a size of each of the source resonator and the target resonator.

6. The wireless power relay apparatus of claim 1, wherein a coil included in the at least one relay resonator is thicker than a coil included in each of the source resonator and the target resonator.

7. The wireless power relay apparatus of claim 1, wherein a number of turns of a coil included in the at least one relay resonator is greater than a number of turns of a coil included in each of the source resonator and the target resonator.

8. The wireless power relay apparatus of claim 1, wherein the quality factor comprises a value enabling the at least one relay resonator to mutually resonate with the source resonator and the target resonator at an efficiency level that is greater than or equal to a predetermined efficiency level, in response to a quality factor of either one or both of the source resonator and the target resonator being lower than a predetermined threshold.

9. The wireless power relay apparatus of claim 8, wherein the predetermined threshold is "100".

10. A wireless power relay apparatus, comprising:
    a plurality of relay resonators, each relay resonator of the plurality of relay resonators configured to mutually resonate with a source resonator and a target resonator, to wirelessly transfer power from the source resonator to the target resonator, and at least one relay resonator among the plurality of relay resonators having a higher quality factor than the target resonator.

11. The wireless power relay apparatus of claim 10, wherein the at least one relay resonator comprises:
    a parasitic resonator disposed on the same plane as either one or both of the source resonator and the target resonator, and configured to form a parasitic coupling.

12. The wireless power relay apparatus of claim 10, wherein the at least one relay resonator is disposed either one or both of inside and outside at least one of the source resonator and the target resonator.

13. The wireless power relay apparatus of claim 10, wherein any one or any combination of a material, a structure, and a size of the at least one relay resonator has a higher quality factor than each of the source resonator and the target resonator.

14. The wireless power relay apparatus of claim 10, wherein:
    the at least one relay resonator comprises a multi-array resonator comprising resonators; and
    the resonators are electrically connected to each other based on a magnetic field formed between the resonators.

15. The wireless power relay apparatus of claim 10, wherein the at least one relay resonator is enclosed by a magnetic material.

16. The wireless power relay apparatus of claim 10, wherein the quality factor comprises a value enabling the at least one relay resonator to mutually resonate with the source resonator and the target resonator at an efficiency level that is greater than or equal to a predetermined efficiency level, in response to a quality factor of either one or both of the source resonator and the target resonator being lower than a predetermined threshold.

17. The wireless power relay apparatus of claim 16, wherein the predetermined threshold is set to "100".

18. A wireless power relay apparatus, comprising:
    a plurality of first resonators, each first resonator of the plurality of first resonators configured to transfer power from a second resonator to a third resonator, and at least one first resonator among the plurality of relay resonators having a higher quality factor than the third resonator.

19. The wireless power relay apparatus of claim 18, wherein a number of turns of a coil included in the at least one first resonator is greater than a number of turns of a coil included in each of the second and third resonators.

20. The wireless power relay apparatus of claim 18, wherein:
- the at least one first resonator comprises resonators in an array; and
- the resonators are connected to each other based on a magnetic field formed between the resonators.

* * * * *